May 3, 1966  E. H. SCHWARTZMAN  3,249,390
GAS LUBRICATED BEARING AND METHOD
Filed May 29, 1963  3 Sheets-Sheet 1

INVENTOR.
EVERETT H. SCHWARTZMAN
BY
Nilsson, Robbins & Anderson
ATTORNEYS.

May 3, 1966     E. H. SCHWARTZMAN     3,249,390
GAS LUBRICATED BEARING AND METHOD
Filed May 29, 1963     3 Sheets-Sheet 2
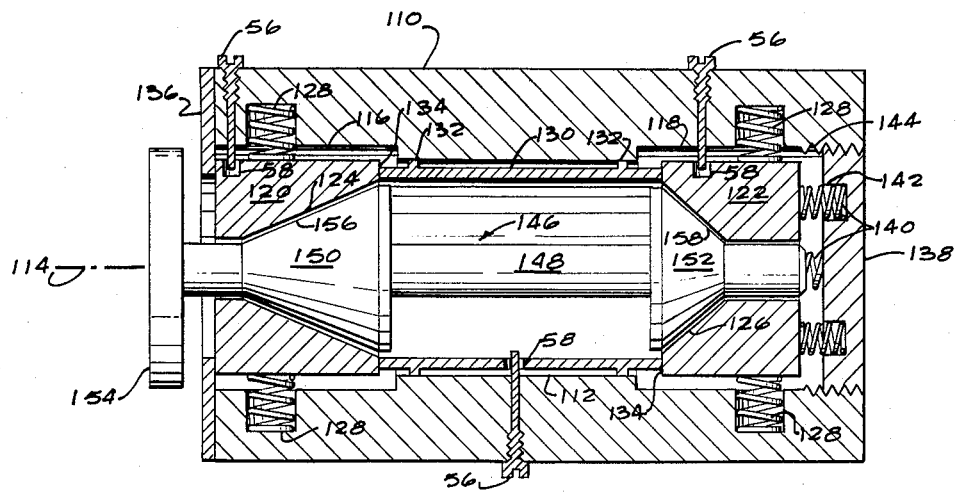
FIG. 5
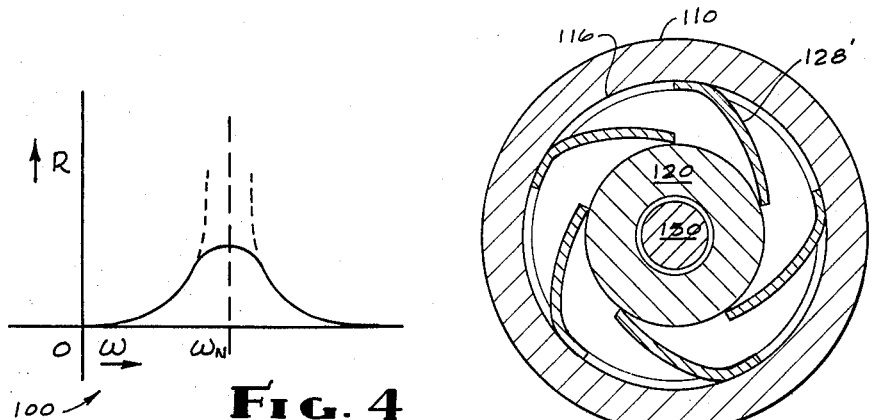
FIG. 4
FIG. 6
INVENTOR.
EVERETT H. SCHWARTZMAN
BY
Nilsson, Robbins & Anderson
ATTORNEYS.

INVENTOR.
EVERETT H. SCHWARTZMAN
BY
Nilsson, Robbins & Anderson
ATTORNEYS.

3,249,390
GAS LUBRICATED BEARING AND METHOD
Everett H. Schwartzman, 457 34th St.,
Manhattan Beach, Calif.
Filed May 29, 1963, Ser. No. 284,791
15 Claims. (Cl. 308—122)

This invention relates generally to bearings for rotary members and more particularly to bearings of the character to be lubricated by a thin film of air or other gas.

In modern technology there occur many instances in which the contact of a rotary member with its support must be lubricated but in which the environment of the journal and bearing precludes the utilization of conventional lubricants. For example, in cryogenic environments ordinary liquid state lubricants such as petro-lubricants or silicone products become unacceptably viscous or solid. In some such instances a flat molecule solid lubricant such as graphite can be adapted for use; however, the utilization of such solid lubricants is obviously very limited.

Similarly, extremely high temperatures preclude the use of conventional lubricants because of vaporization and thinning effects.

Other restrictive or prohibitive environments for conventional lubricants include chemically active ones wherein the lubricant would deleteriously react with the chemical; a well-known example is oxygen which is explosively reactive with even traces of petro-lubricants. A further example of an environment in which conventional lubricants are generally precluded is a radioactive environment in which typically the lubricant is radiologically chemically altered and loses its lubricating characteristic.

In recent years considerable effort has been expended toward developing gas lubricated bearings to provide a cure for these and other deficiencies of the conventionally lubricated bearings. In general the lubrication is achieved by containing a thin film (approximately 0.0001 inch) of gas between an accurately machined shaft journal and the bearing. The result has been to provide bearings for special applications which are substantially insensitive to even super extremes of temperature. In addition since there is no "contact" between the solid parts there is no coulomb friction or heating therefrom and consequently no wear from such effects. The gas lubricating bearing consequently may be operated at very high speeds with a very long life of exceedingly stable performance characteristics.

The mechanics of the gas film is discussed at great length in mechanical engineering and physical society journals in recent years and needs not to be treated with any depth here. Two basic approaches to the mechanization of gas lubricated bearings, some generic and specific deficiencies and limitations of each, and the departure in some respects of the present invention from these approaches will be briefly discussed.

The two basic approaches so indicated are usually labeled "hydrostatic" and "hydrodynamic." In the first the gas under a predetermined pressure is continuously supplied to the bearing interspace; in the hydrodynamic case the gas film is self-maintaining when relative tangential velocities of approximately 50 feet per second and greater are reached, and may, when desired, be totally isolated from other sources of gas. This capability to be sealed off causes the hydrodynamic bearing to be attractive in such applications as reference gyros, for example, in satellites and missile guidance, where the carrying of or maintaining of a source of pressurized gas would be "costly."

However, the machining tolerances for the hydrodynamic case are significantly more stringent than for the hydrostatic case since the bearing interspace gap must be less than .0001 inch for the hydrodynamic bearing; and the small gap gives rise to a detectable viscous friction at high bearing speeds which is manifest by the drag on the rotary shaft at such speeds. Further the self-maintaining of the film pressure encumbently limits the versatility of the load capability and selection of critical (resonant) angular speeds for the bearing.

Machining tolerances for the manufacture of hydrostatic bearings though relaxed with respect to those required for the hydrodynamic type are still stringent. Furthermore the gas feed into the bearing interspace must in some cases be angularly symmetric in order to support the rotary shaft and to preclude imbalance with respect thereto. As implied above, however, the hydrostatic approach provides a more versatile and stable bearing because of its control ability and larger spacings.

In accordance with the best of the developments of the prior art, support against both axial and radial thrusts in gas lubricated bearings can be achieved by utilizing a pair of juxtaposed cylindrical surfaces and a pair of juxtaposed radially disposed surfaces wherein one surface of each pair is on the shaft and its juxtaposed counterpart is on a stationary frame or housing. There is no appreciable cooperation between the two bearing pairs, their supporting forces being mutually orthogonal.

A generic deficiency or limitation of gas lubricant bearings heretofore available is that regardless of the machine tolerances and regardless of the care with which the shaft is loaded, a finite rotary imbalance exists which causes an oscillation in cooperation with the elastic restoring force of the supporting gas film. In practice the supporting film has a relatively low "spring" constant; and the resonant or critical speed of the rotary shaft is so low as to be a severe limitation on high speed utilizations of gas lubricated bearings. The severity of the resonance problem is caused by the fact that the near zero viscous friction of the gas film affords near zero damping of the oscillating bearing. Consequently it oscillates without limit until it strikes the stationary bearing or bushing. Typically the resulting coulomb friction precludes driving the shaft above the critical frequency or it causes destructive heating and wear, or both.

Another difficulty generally suffered by gas bearing systems heretofore available is loss of gas film pressure with resulting metal to metal contact at certain speeds due to bearing "whirl" the phenomenon of which in gas bearings is believed caused by the rotating shaft being disposed, because of its weight, off-center with respect to the axis of the stationary bushing. This means the shaft is closer to the bushing at one point than at others and experiences an angularly non-balanced viscous drag. This drag, or its reaction, is in a direction opposite to that of the shaft rotation and causes a rotation, effectively, of the angularly unsymmetric disposition of the shaft. The whirl rotation, being due to the reverse-directed viscous drag, is contra to the shaft rotation and is seen by the gas film as a reduction in the shaft velocity. Consequently, as the whirl velocity increases and being opposite to the shaft rotation, a significant degradation of the support capability of the gas film may occur and often results in undesired metal to metal bearing contact at a high shaft speed.

The restoring force and whirl resistance of the gas film may sometimes be influenced to some degree by the gas pressure, particularly in the hydrostatic case; and the mass of the shaft may be minimized in order to increase the critical speed. However, these often represent compromises in the stability and load capabilities of the bearing and do not constitute a general solution.

It is therefore an object of the present invention to provide a gas lubricated bearing and method which are not subject to these and other limitations and disadvantages of the prior art.

It is another object to provide such a bearing system in which a single pair of juxtaposed surfaces provides support against both axial and radial thrust.

It is another object to provide such a bearing system in which the gas film thickness in both the radial and axial direction is adjustable by the axial movement of a single one of such surfaces.

It is another object of the present invention to provide such a bearing system in which frictional damping is coupled to the radially oscillating shaft without solid-to-solid contact between the rotating shaft and its supporting structures.

It is another object to provide such a system in which deleterious bearing whirl effects are substantially eliminated.

It is another object to provide such a bearing system in which the allowable amplitude of radial oscillation of the shaft at critical frequency without solid-to-solid contact is increased without increasing the equiescent thickness of gas film.

It is another object to provide such a bearing system in which the thickness of the gas film is selectively self-adjusting or extrinsically adjustable or, cooperatively, both.

Briefly, these and other objects and advantages are achieved in accordance with the structural aspects of one example of the invention which includes a central shaft having a spaced pair of conical journals thereon, each of which is a figure of revolution about the axis of the shaft and which are oppositely directed with respect to a plane perpendicular to the axis. Radially surrounding each of the conical journals is a bushing having a conical internal bearing surface which is juxtaposed with respect to its respective shaft journal and spaced therefrom by a lubricating gas film thickness. Both of the conical bushings are supported by a frame or housing member that has no rotational freedom with respect thereto.

In this particular example one of the bushings is radially spring-supported, by an all metal structure, so that it has a radial freedom of motion within the frame member. The motion of the bushing permitted by this freedom is oscillatory with its own resonant frequency due to its supporting springs and mass. However a coulomb friction damping contact is made between the spring support bushing and the frame member to damp its radial oscillatory motion.

The other conical bushing is not, in this example, radially spring supported, but is provided with an axial freedom of motion within the frame member. The axial motion is determinative of the thickness of the conical gas films, and the motion is axially biased by a spring or gas pressure in a direction toward minimizing the gas film thickness, this bias being counterbalanced by the pressure of the dynamic gas film.

In operation, again briefly, oscillations of the rotary shaft drive the radially "floating" bearing through the gas film "spring" as a linkage. This permits the shaft a greater amplitude of oscillation without effectively increasing the thickness of the gas film. At the same time the coulomb friction experienced by the bearing bushing is coupled back through the gas film linkage to the radially oscillating shaft, thereby subtracting from its oscillatory energy without solid-to-solid contact. The natural frequency of the suspended bushing is selected to be relatively low so that once the shaft is passed through its critical frequency, there are no further resonance problems; and the shaft may be rotated at higher frequencies with ever decreasing oscillation amplitude.

A particular example of another deficiency of conventional bearings is in precision surface grinding applications wherein bearing noise is substantially always present and is manifest as imperfections or "noise" on the ground surface. This occurs because the bearings, typically ball bearings, are inherently imperfect and drive the shaft into irregular, imperfect rotation.

An additional advantage of the present invention, in this connection, is that it operates above its critical, or resonant, frequency of rotation and rotates regularly and perfectly about a real axis of revolution. If a grinding wheel affixed to the shaft is dressed at the operating speed of the gas lubricated bearings, then the grinding wheel-shaft system will rotate perfectly about such real axis in a manner to permit "noiseless" precision surface grinding.

Still additional objects and advantages as well as further details of the above and other novel features of the invention and their principles of operation, will become apparent and be best understood from a consideration of the following description taken in connection with the accompanying drawings which are presented by way of illustrative example only and in which:

FIG. 4 is a graph plotting amplitude of radial oscillation R on the ordinate as a function of rotational frequency $\omega$ on the abscissa;

FIG. 5 is a simplified longitudinal sectional view of a hydrodynamic example of the invention;

FIG. 6 is a simplified cross sectional view of an alternative example of the invention;

Referring to the figures in more detail it is stressed that the particulars shown are by way of example only and illustrative discussion only and are presented in the cause of providing what is believed to be the most useful and readily understood description of the principles and structural concepts of the invention. Specifically the detailed showing is not to be taken as a limitation upon the scope of the invention which is defined by the appended claims forming along with the drawings a part of this specification.

Figure 1:
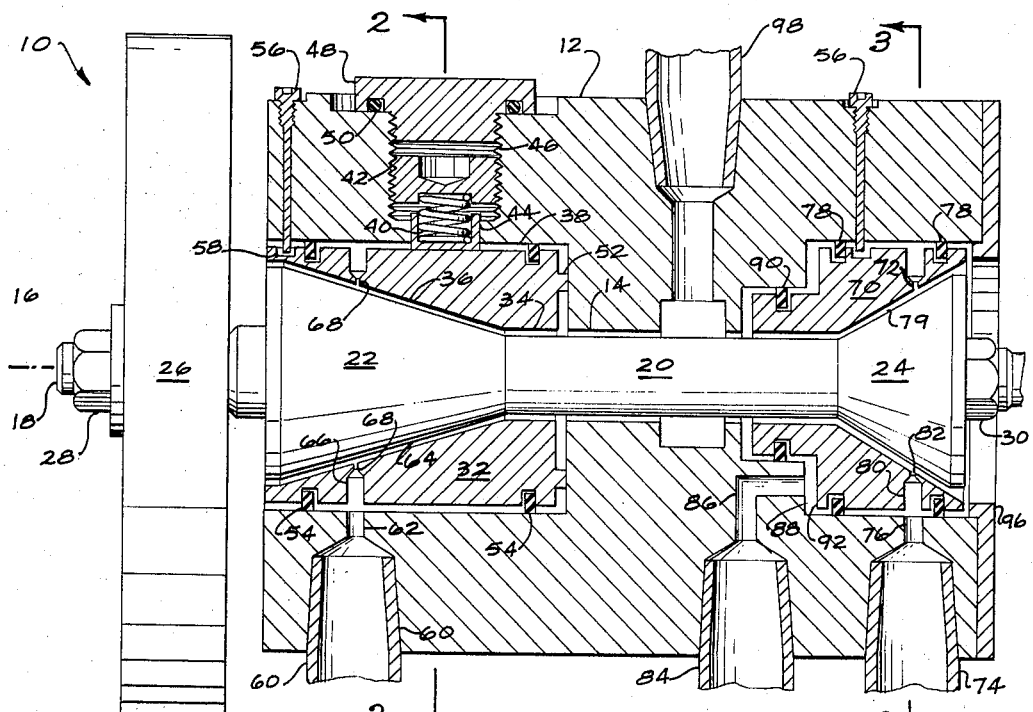
FIG. 1 is a longitudinal sectional view of a gas lubricated bearing of hydrostatic character constructed in accordance with the principles of the present invention.

In the example of the invention illustrated in FIG. 1 a hydrostatic type of gas lubricated bearing system 10 is shown which includes an outer housing or frame member 12 which is non-rotating and which has a central opening 14 therethrough which is in the form of a figure of revolution about a system axis 16. Also disposed angularly, symmetrically above the system axis 16 is a rotating shaft 18 which includes a mid-portion 20, a forward conical journal 22, and an oppositely disposed rear conical journal 24. The shaft 18 may be a composite assembly including the mid-portion 20, the conical journals 22, 24 and a flywheel member 26 which are all held compressively on a central spindle between a pair of machine nuts 28, 30. It may be noted that member 26 may be a flywheel per se or may be a schematic representation of the load seen by the bearing system 10.

The conical surfaces of the journals 22, 24 are seen to be diverging from the axis 16 in opposite directions from each other and away from a plane disposed perpendicularly to the axis 16 between the two conical journals. It should be noted further that the angles of divergence are not necessarily equal. As in this example, the divergence of the conical surface of the journal 22 is considerably less than that of the conical journal 24. As will be explained more fully below this arrangement tends to maximize the vertical load carrying capability of that portion of the bearing disposed nearest to the load 26 while the steeper angle of divergence associated with the conical journal 24 provides greater resistance to axial thrust of the rotating shaft 18.

Mounted within the housing or frame member 12 is a non-rotating bearing 32 having a central opening 34 therethrough which is a figure of revolution disposed about the system axis 16 and which includes a conical bearing surface 36 which is formed with an angle of divergence from the system axis 16 which is equal to that of the conical surface of the conical journal 22, and which is juxtaposed with respect thereto by an annular-like distance which defines a containing region for a thin lubricating gas film. The juxtaposed surfaces should be relatively smooth and true but need not be particularly higher polished.

The non-rotating bearing 32 is disposed within a cylindrical bore 38 in the frame member 12, the bore 38 being concentric with the system axis 16. The bearing 32 is supported within the bore 38 by a plurality of radially disposed, all metal supporting springs 40 which extend from an adjusting screw 42 to a bearing cup 44, the latter being in compressive, supporting contact with the outer cylindrical surface of the non-rotating bearing 32. The threaded bore 46 for the adjusting screw 42 may be sealed by a screw cap 48 having a fitted O-ring 50 disposed compressively between it and the frame member 12. As may be seen this arrangement of adjustment for the supporting springs 40 provides considerable versatility for the system with regard to the radial alignment of the non-rotating frame member 12 and bearing 32 as well as the magnitude of the spring pre-load of the supporting springs 40. It is also noted that the oscillatory motion of the bearing 32 due to the restoring forces of the supporting springs 40 may be inpart damped by the coulomb friction between the bearing cup 44 and its associated opening through the frame member 12. Additional coulomb friction for such damping purposes is provided in this example by an axially extending annular shoulder member 52 which extends from the bearing 32 into rubbing contact with the bottom of the cylindrical bore 38 in the frame member 12. A pair of sealing piston rings 54 which tend to contain the lubricating gas may provide additional coulomb damping for the radially oscillatory motion of the floating, non-rotating bearing 32. To secure the bearing 32 against undesired axial or rotational motion with respect to the frame member 12 a locking pin 56 may be provided through a portion of the frame member 12 and project in a holding recess 58 relieved from the outer cylindrical surface of the bearing 32. As indicated in the figure, the relative diameters of the pin 56 and holding recess 58 are not critical.

In this example the lubrication gas is fed into the bearing system through an input conduit 60 which may be fitted into a gripping bore 62 in the frame member 12 as shown. The frame member 12 is then further ported from the bottom of the bore 60 to the bore 38 by a communicating passageway 62. Thusly there is provided communication between the input conduit 60 and that portion of the bore 38 between the piston rings 54. Communication from this region into the lubricating gas film region 64 is provided through an annular channel 66 which is at angularly spaced intervals ported to the gas film region 64 by small bores 68.

The other, rear, conical journal 24 is similarly disposed within a non-rotating bearing 70 having an internal conical surface 72 which is juxtaposed about and spaced from the conical surface of the bearing 24 by a gap which defines a containing region for the thin lubricating gas film. Again, as with the bearing 32 and journal 22, the lubricating gas is supplied through an input conduit 74 and a communicating port 76 to a region within the frame member 12 between a pair of sealing piston rings 78 and into the inter bearing gas film space 79 through an annular channel 80 and a series of angularly spaced radially directed ports 82. A second locking pin 56 may be utilized as with the bearing 32 to limit the axial and rotational motion of the bearing 70.

The mounting of the bearing 70 within the frame member 12 is not in this example spring supported as is the bearing 32 at the load end of the system. The bearing system 70 is however provided with an axial degree of freedom and its axial position determines the annular thickness of the lubricating gas film regions 64, 79. This single control feature for both of the bearing films is achieved by virtue of the axial freedom of motion of the rotating shaft 20 so that if the bearing 70 is moved in a manner to decrease the film thickness, the shaft will move correspondingly to decrease both bearing films. In addition it may be seen that a vernier type of advantage is achieved in such adjustment because of the slope of the conical surfaces so that a given axial motion will affect the thickness of the gap by a mount which may be reduced by a factor of between 3 and 4, since the motion is decreased by the slope of the bearings and is divided between the two sets of juxtaposed surfaces.

The control of the position of the axially movable bearing 70 is achieved by gas pressure, in this example, supplied through a conduit 84 which communicates through a port 86 into a bearing control region 88, between a piston ring 78 and a piston ring 90. In this connection it may be seen that gas pressure supplied to the region 88 will tend to urge the bearing 70 to the right, as viewed in the drawing, by virtue of the effect of that pressure upon a radially directed planar surface 92 on the left-hand end of the bearing 70. To preclude the possibility of siezing of the rotating shaft by the stationary bearings in the event of loss of gas film pressure, a bearing stop 96 is provided as shown against which the bearing 70 abuts in a manner to define the minimum gas film thickness permissible without seizing.

In order further to minimize the probability of seizing as for example due to differential thermal expansions the major parts of the bearing system 10 may be fabricated from the same material. Thusly as the rotating shaft is exposed to extreme temperature so also will be the frame member 12 and the bearings 32, 70 and consequently to a relatively high order of proximation the critical parts will expand and contract in unison.

Figure 2:
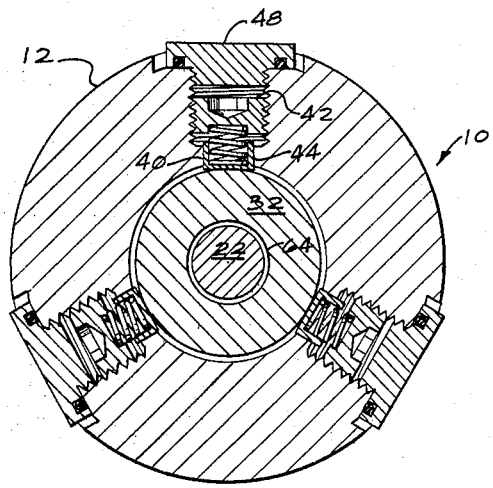
FIG. 2 is a cross sectional view of the structure of FIG. 1 taken along the lines 2—2 thereof.

Referring to FIG. 2 which is a sectional view taken as shown in FIG. 1 across the left-hand portion of the gas lubricated bearing system 10, the housing or frame member 12 is shown with the supporting all metal springs 40 angularly balanced to the support and radially align the non-rotating bearing 32 radially within the non-rotating frame member 12 and separated from it by the gas film gap 64 is the conical journal 22 of the rotating shaft. Again the screw caps 48 and the adjusting spring retaining screws 42 and the spring bearing cups 44 are shown.

Figure 3:
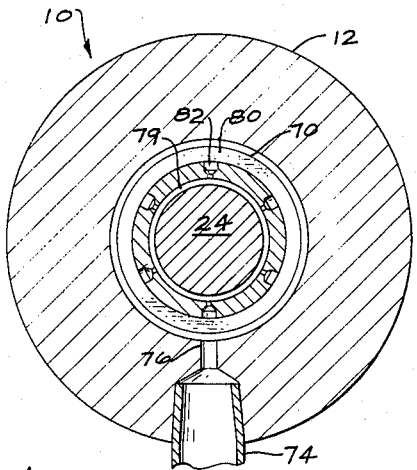
FIG. 3 is a cross sectional view of the structure of FIG. 1 taken along the lines 3—3 thereof.

Referring to FIG. 3 the rear conical journal 24 is shown in cross section as being disposed within, and juxtaposed cylindrically angularly from—by the gas film gap 79—the non-rotating bearing 70. In addition the side of the annular channel 80 and the ports 82 through the bearing 70 are shown. Surrounding the bearing 70 is seen the housing member 12 through which the input conduit 74 and the port 76 communicate.

With further reference to the structure illustrated in FIGS. 1-3 it is noted that the coulomb friction between the shoulder member 52 of the non-rotating bearing 32 and the bottom of the bore 38 in the frame member 12 is indirectly maintained by the pressure in the bearing control region 88, in the following manner:

The pressure in the region 88 tends to urge the bearing 70 to the right which increase the pressure in the gas film region 79 which in turn tends to urge the rotating shaft to the right, as viewed in the drawing. When the shaft is thusly urged, the pressure in the lubricating gas film region 64 about the journal 22 cause the non-rotating bearing 32 to be urged to the right thusly insuring a frictional contact betwen the annular shoulder member 52 and the frame member 12. Not previously noted is an output conduit 98 which provides a relief as desired for undesired gas pressure in the central region of the bearing system, and provides the desired direction and magnitude of flow of the lubricating fluid.

In operation as the rotating shaft 18 is revolved about its axis 16 the gas lubricating film phenomenon begins to manifest itself and a load supporting film pressure is generated in the gas film regions 64, 79, and, depending on the magnitude of the load, the hydrostatic pressure, and other circumstances of the operating environment, the rotating shaft may be supported against the forces of gravity. As higher rotating speeds are achieved, the gas film press increases and support becomes even more positive. However because of the inherent imbalance in the structure and loading of the rotating shaft, it will not rotate perfectly about the axis 16 but rather will tend to oscillate in the radial and angular directions. At a critical frequency designated $\omega_n$ on the graph 100 of FIG. 4, these imbalances in the shaft manifest themselves in a resonance phenomena. This is illustrated on the graph 100 by the increase of the amplitude R of the radial oscillation of the rotating shaft. In the region of $\omega_n$ which is the natural resonant frequency of the rotating shaft the vertically directed extensions of the curve on the graph 100 which are shown in dotted lines indicate that without damping of the oscillation the rotating shaft would wobble off axis without limit, the rotating shaft would make metal-to-metal contact with its journals, and the bearing would become damaged or at least ineffective for support at higher angular velocities, since it would not be possible to drive the speed of the bearing past its natural resonant frequency.

In accordance with the achievements of the present invention however, the tendency toward unlimited oscillation amplitude is precluded by coulomb friction damping reflected from the frictional contact of the non-rotating bearing 32 through the lubricating gas film to the rotating shaft. This is accomplished in the following manner. As the rotating shaft begins its radial oscillation, the non-rotating bearing 32 is also driven in a radial oscillation through the coupling of the lubricating gas film and the non-rotating bearing 32 is permitted to oscillate in the radially direction by virtue of its spring suspension. In radial oscillating however the bearing 32 makes frictional contact with the stationary frame member 12 through the annular shoulder member 52, the sealing piston rings 54 and the spring bearing cups 44. The damping of the radial oscillation of the bearing 32 is coupled back through the lubricating gas film region 64 to the oscillating rotating shaft 22 whereby the oscillations of the latter are indirectly but effectively damped. It is pointed out that the resilient, floating mounting of the non-rotating bearing 32 provides protection against metal-to-metal contact with the rotating shaft in two ways: first, as the oscillating shaft approaches the bearing 32 the pressure of the gas film moves the bearing 32 in the same direction so that although the cap distance is not drastically altered, the rotating shaft is permitted some freedom of radial motion; secondly, the radial oscillatory motion of the rotating shaft 22 is impeded and damped by the coulomb friction which is coupled to the shaft as described above.

It may further be seen that the controllable magnitude of the pressure in the control region 88 provides even greater versatility and flexibility for the system of the invention. In this connection the pressure may be adjusted in a manner best to accommodate the imbalance and the particular load experienced by the system and may when desired be programmed to best compensate for the resonance effects illustrated in the graph 100.

Referring to FIG. 5 an embodiment of the invention is illustrated which is of the hydrodynamic type as opposed to the hydrostatic type shown in connection with FIG. 1 above. In this example the necessary pressure for the lubricating gas film phenomenon is provided intrinsically by virtue of the geometries involves and the rotational kinematics utilized. In the figure a stationary frame member 110 is shown with a central cylindrical opening 112 formed therethrough symmetrically disposed about a system axis 114. A cylindrical bore 116, 118, is provided respectively in each end of the frame member 110 also symmetrically about the system axis 114 and communicating with the central opening 112. Disposed concentrically within each of the cylindrical bores 116, 118, is a non-rotating bearing 120, 122 respectively. Each of the non-rotating bearings 120, 122 is internally relieved to form a conical bearing surface 124, 126 respectively which diverge away from the system axis 114 in opposite direction. As in the previous example the angle of divergence of the conical bearing surface 124 which will be seen later to be the load end of the bearing is smaller in order to provide a greater magnitude of horizontal projection surface to maximize the vertical load capability of the bearing system; while the conical bearing surface 126 is at a larger angle of divergence in order to maximize its thrust load capability.

Unlike the angles of divergence of the bearings 32, 70 of the previous example, however, the conical surfaces 124, 126 are seen to diverge away from the axis 114 toward each other while in the previous example the divergence was away from each other. It is pointed out that the orientation of the angles of divergence of the conical bearing surfaces is not determined by whether the bearing system is hydrostatic or hydrodynamic. Other considerations germane to the particular application will cause the skilled artisan to choose the most appropriate configuration for his application. It may be noted for example that when maximum vertical, that is transverse to the axis, loading is desired for the bearing system, the configuration of FIG. 1 will likely be chosen and such a decision would be based upon the fact that the gas film lubricating pressure in this general type of a bearing depends upon the relative tangential speeds between rotating shaft and the non-rotating bearing. Accordingly, it is apparent that the conical configuration in FIG. 1 provides the highest possible tangential speed for the gas film near the load and in addition a given film lubricating pressure will be achieved at the load end of the shaft at a significantly lower angular velocity of the shaft.

Each of the non-rotating bearings 120, 122 is symmetrically floatingly supported within the respective bores of the frame member 110 by a plurality of all metal suspension springs 128. In this manner each of the bearings is held in concentric alignment about the system axis 114 and is oscillatingly supported within the frame member with a centralizing restoring force determined by the effective combined spring constant of the plurality of mounting springs. In this example a spacer cylinder 130 is mounted within the central opening 112 of the frame member 110 and is spaced therefrom by a plurality of annular collar extensions 132. These collar extensions make an axially sliding contact with the cylindrical wall of the central opening 112. The ends of the spacer cylinder 130 are disposed in contact with a radially disposed shoulder surface 134 formed on the juxtaposed ends of each of the non-rotating bearings 120, 122. The bearings and the spacing cylinder 130 are normally held in compressive contact between a stopping member 136 which is affixed rigidly to the frame member 110 and partially occludes the opening of the cylindrical bore 116, and a threaded retaining plate 138. A set of axially bearing biasing springs 140 is retained within associated retaining holes 142 as shown. The compressed springs 140 bear against the left-hand end wall of the non-rotating bearing 132 and urge it axially against the spacer cylinder 130 which communicates the compression to the bearing 120 and thence to the stopping member 136. The degree of depression sustained within the series just recited is determined by and may be adjusted by the degree to which the retaining plate 138 is threaded into the bore 118 by means of its matching threads 144 formed therein as shown. As in the structure shown in FIG. 1 locking pins 56 may be provided through the frame member 110 and cooperate with associated holding recesses 58 to prevent angular motion of the journals 120, 122 and the spacer cylinder 130.

Disposed radially within the bearings and frame member shown in FIG. 5 is a rigid, rotating shaft 146 which includes a central portion 148 which is disposed supportingly between a load end bearing 150 and a thrust end bearing journal 152. Affixed to or coupled to the left-hand end as viewed in the drawing, of the rotating shaft 146 is a load as represented by a flywheel 154. The load end bearing journal 150 is formed with a conical bearing surface 156 which is geometrically juxtaposed with respect to the conical bearing surface 124 of the non-rotating bearing 120. In like manner the thrust end bearing journal 152 is provided with a conical bearing surface 158 which is juxtaposed with respect to the conical bearing surface 126 of the non-rotating bearing 122. The axial spacing of the journals 150, 152 is provided with a magnitude such that the gap thickness of the inter-bearing spacing of the juxtaposed conical surfaces is at its minimum permissible value to preclude metal-to-metal contact (this may best be determined by the length of the spacer cylinder 130) to the end that the critical minimum axial spacing of the non-rotating bearings will always be adequate to preclude metal-to-metal contact between the bearings and their journals. The spacer cylinder 130 and the rotating shaft 146 is preferably fabricated from the same material so that each has identical coefficients of thermal expansion. Further to this end the spacer cylinder 130 is substantially thermally isolated from the frame member 110 by the minimum contact areas of the annular collar extensions 132. Accordingly it may be noted that the rotating shaft 148 and the spacer cylinder 130 will "see" substantially the same thermal influences.

In operation, the example of the invention illustrated in FIG. 5 has floating bearings at both ends of the rotating shaft 146 and the resonance absorption phenomenon discussed in connection with the example of the invention of FIG. 1 will occur with respect to both of the bearings in FIG. 5 as the angular velocity of the rotating shaft 146 is turned up to very high speeds. Further to be noted in connection with this example is that the coulomb friction for damping the oscillatory energy of radially vibrating non-rotating bearings 120, 122 is provided by the frictional contact between the bearings and the ends of the spacer cylinder 130. In addition the bearing 120 experiences a frictional contact with the stopping member 136; and the bearing 122 experiences in certain cases additional friction by sliding across the ends of the biasing springs 140. Further to be noted in connection with the operation of this example of the invention is the function of the non-rotating bearing 122 to move axially against the biasing effect of the springs 140 as the dynamic gas film pressure in the inter-bearing spaces increases. Thus a constant automatic balance is achieved during the operation of the system at all gas lubricated speeds.

Referring to FIG. 6 there is illustrated an alternative embodiment of the invention in which the mounting springs 128 are replaced by a plurality of inwardly biased all metal leaf type springs 128'. These may be formed integrally as a unit as by partially punching out fingers from a strip of spring metal stock and then mounted within the bore 116 of the frame member 110 in a manner to support the non-rotating bearing 120 in concentric alignment about the journal 150 of the rotating shaft.

Figure 7:
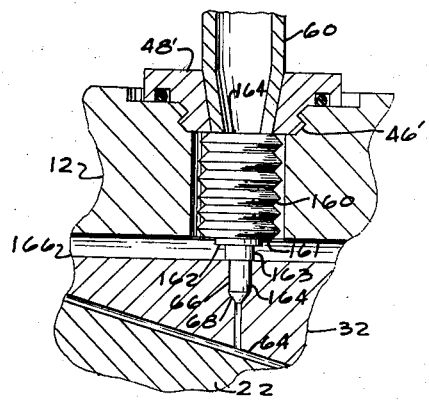
FIG. 7 is a sectional view of a portion of an alternative embodiment of the invention.

Referring to FIG. 7 an alternative example of the communication means between an external source of pressurized gas and the inter-bearing space of a hydrostatic type of gas lubricated bearing is illustrated in which the lubricating gas is fed directly to the inter-bearing space in a manner to eliminate the need for sealing rings journal and frame. In the figure, which may be considered to be an alternative portion of the invention shown in FIG. 1, for which reason like reference numerals will be used where deemed helpful to the reader, the input conduit 60 is fitted into a central opening provided through the screw cap 48' which in turn is threaded into the bore 46'. Compressed between the screw cap 48' and the non-rotating bearing 32 is disposed an all metal, elastic, compressed bellows 160, the bottom surface 161 of which is sealed to the flange 162 of a tubular, rigid conduit 163 which has a reduced diameter portion 164 inserted in a sealed manner within the channel 66 and one of the bores 68. The flange 162 and the conduit 163 are open to provide a direct passageway between the interior of the bellows 160 and the inter-bearing space or gas film region 64. The upper end of the bellows is coupled to the input conduit 60.

Clearance is provided about the bellows, in the frame member, to permit the required axial motion of the non-rotating journals for maintaining the axially controlled correct gas film thickness.

Figure 8:
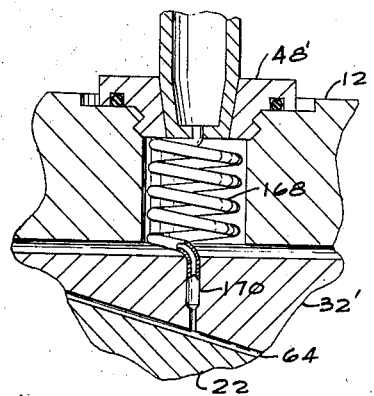
FIG. 8 is a sectional view of a similar portion of another alternative structural example of the invention.

Referring to FIG. 8 a different type of all metal bellows or spring is utilized in a similar manner dually to support a non-rotating bearing 32' within the frame member 12 and supply the lubricating gas directly to the gas film bearing region. In this example a hollow spring 168 is compressed between the screw cap 48' and the non-rotating bearing 32'. The hollow spring 168 is terminated within a port 170 which communicates directly to the lubricating gas region 64 between the bearing 32' and the rotating shaft journal 22.

In these latter examples, the function of the locking pin 56 (see FIG. 1) is performed by the protrusion of the bottom end of the hollow spring 168 or bellows conduit 163 into the port 170 or 68 respectively; and the function of the sealing ring 54 is performed by the sealed, direct, resilient conduit between gas source and intra bearing space.

Figure 9:
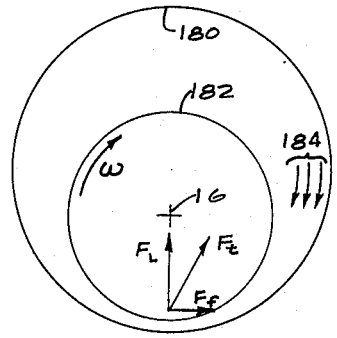
FIG. 9 and FIG. 10 are schematic diagrams useful in describing the phenomenon of whirl as suffered in prior art gas lubricated bearing.

Referring to FIG. 9 the diagram shown illustrates the phenomenon of bearing whirl which, as discussed above, is a deleterious phenomenon suffered by gas lubricated bearings constructed in accordance with prior art techniques. In extremely exaggerated proportions the outer circle represents the non-rotating bearing surface 180 while the inner circle represents the outer surface of the rotating shaft 182. As indicated by the curved vector the shaft 182 is rotating at a clockwise angular velocity of $\omega$ in a manner to cause the circulation in the same direction of the inter bearing gas film represented by the vectors 184. The vector $F_L$ represents the reactive force exerted by the gas film on the rotating shaft 182. The smaller vector $F_f$ represents the drag resistance due to the viscous friction of the lubricating gas. The combination of these two reactive forces is represented by the vector $F_t$ and is seen to pass off-center through the rotating shaft 182, in a manner to apply a counterclockwise torque on the shaft 182.

Figure 10:
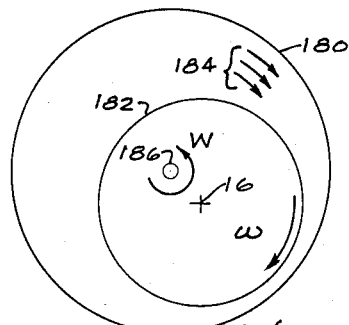

The result of the counterclockwise torque exerted by the reactive forces is the counterclockwise whirl represented by the W in the FIGURE 10 and is manifest as a rotation of the shaft about a whirl axis 186 while the shaft is spinning about its own axis 16 at the angular velocity $\omega$ in the opposite direction. Since these supporting and lubricating properties of the gas film depend upon the relative tangential velocities of the rotating shaft 182 and the non-rotating bearing 180, it may be seen that as ω approaches W, at least a portion of the supporting properties of the gas film will be cancelled out since the gas will have a velocity component of rotation associated with it that is the result of the velocity components due to rotation of the shaft 182 (which is equal and opposite to the spin ω of the shaft 182) minus the velocity component due to the whirl W of the shaft 182. The result is often a collapse of the supporting gas film layer with consequent damaging metal-to-metal contact of the relatively rotating parts.

Figure 11:
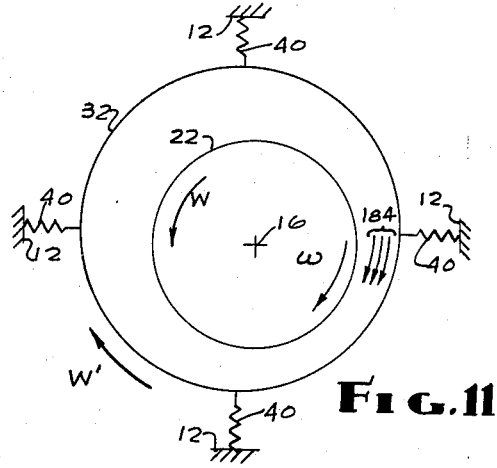
FIG. 11 is a schematic diagram illustrating the operation of a gas lubricated bearing constructed in accordance with the principles of the present invention.

Referring to FIG. 11 the function of the gas lubricated bearing system of the present invention in obviating the whirl phenomenon is illustrated. In accordance with the present invention the non-rotating bearing 32 is spring supported, as shown in more detail in FIG. 1, by a plurality of centrally restoring springs 40 which are all affixed at one end to the stationary frame member 12. The rotating shaft journal 22 spinning about the system axis 16 at an angular velocity ω creates the gas film represented by the vectors 184. Any whirl effects or tendencies are indicated by the vector W. As discussed earlier, however, the whirl effects are substantially eliminated in the practice of the present invention by two effects. First is a counteracting whirl W' experienced by the non-rotating bearing 32 as a result of the force equal and opposite to the force $F_t$ which the lubricating gas film exerts in accordance with Newton's second law on both the rotating shaft 22 and the non-rotating bearing 32. Although the bearing 32 is not permitted to rotate, it is free to oscillate in an angular sense in synchronism with the virtual whirl of the rotating shaft 22. Secondly, because of the coulomb friction damping effects associated with the oscillating bearing 32 which are coupled through the gas film back to the rotating shaft 22 the whirl energy is continually absorbed and thereby not permitted to build up to a deleterious level.

There has thus been described a number of examples of various structural and method aspects of a gas lubricating bearing which achieves the objects and exhibits the advantages set forth hereinabove.

What is claimed is:

1. A gas lubricated bearing comprising: a stationary frame member having, therethrough, an opening with a longitudinal axis; a rotary body disposed within said opening and having an axis of revolution substantially coincident with said longitudinal axis; at least one journal surface on said rotary body; an outer, substantially non-rotating bearing; all metal means for resiliently supporting said non-rotating bearing by and within said frame member with a centralizing restoring supporting force, said bearing having an internal surface geometrically similar to that of said journal surface and being juxtaposed thereabout with a spacing of juxtaposition which defines a region for a lubricating gas film; coulomb friction providing means carried by said frame member in contact with said bearing for damping oscillatory motion thereof with respect to said frame member; lubricating gas disposed therewithin whereby said rotary body is radially, force-coupled to said bearing.

2. The invention according to claim 1 in which said metal means for resiliently supporting includes at least three springs mounted at substantially equal angular intervals about said axis between said non-rotating bearing and said frame member.

3. A gas lubricated bearing system for absorbing and dissipating radially oscillatory energy at critical speeds comprising: a stationary frame member having, therethrough, an opening with a longitudinal axis; a rotary body disposed within said opening and having an axis of revolution substantially coincident with said longitudinal axis; at least one journal surface on said rotary body; an outer, substantially non-rotating bearing; all metal means for resiliently supporting said non-rotating bearing within said frame member with a centralizing restoring supporting force, said non-rotating bearing having an internal surface geometrically similar to that of said journal surface and being juxtaposed thereabout with a spacing of juxtaposition which defines a region for a lubricating gas film; and frictional damping means coupled between said non-rotating bearing and said frame member for absorbing radially oscillatory energy of said rotary body.

4. The invention according to claim 3 which further includes means for supplying lubricating gas hydrostatically to said region.

5. The invention according to claim 3 which includes lubricating gas contained hydrodynamically in said region.

6. A gas lubricated bearing comprising: a stationary frame member having, therethrough, an opening with a longitudinal axis; a rotary body disposed within said opening and having an axis of revolution substantially coincident with said longitudinal axis; at least one journal surface on said rotary body; an outer, substantially non-rotating bearing; all metal resilient bearing support means resiliently supported by and within said frame member and exerting a centralizing restoring supporting force on said bearing, said bearing having an internal surface geometrically similar to that of said journal surface and being juxtaposed thereabout with a spacing of juxtaposition which defines a region for a lubricating gas film; means for providing a gas film in said region for force-coupling said rotary body to said bearing; and frictional damping means coupled between said non-rotating bearing and said frame member for absorbing radially oscillatory energy of said rotary body.

7. The invention according to claim 6 in which said gas film means includes lubricating gas and means for hydrodynamically containing it in said region.

8. The invention according to claim 6 in which said gas film means includes means for supplying lubricating gas hydrostatically to said region.

9. A gas lubricated bearing comprising: a stationary frame member having, therethrough, an opening with a longitudinal axis, a rotary body disposed within said opening and having an axis of revolution substantially coincident with said longitudinal axis; at least one journal surface on said rotary body; an outer, substantially non-rotating bearing; all metal support means for resiliently supporting said non-rotating bearing within said frame member with a centralizing restoring supporting force, said bearing having an internal surface geometrically similar to that of said journal surface and being juxtaposed thereabout with a spacing of juxtaposition which defines a region for a lubricating gas film; means for containing gas therewithin whereby said rotary body is radially, force-coupled to said bearing; said support means including a plurality of angularly evenly spaced gas conducting spring means connected in a conduit forming manner between a source of lubricating gas and said region; and frictional damping means coupled between said non-rotating bearing and said frame member for absorbing radially oscillatory energy of said rotary body.

10. The invention according to claim 9 wherein said gas conducting spring means each comprise a hollow bellows spring which is sealed to said source and to said region.

11. The invention according to claim 9 in which each said spring means comprises a coil spring formed of a hollow tubular conductor and whose ends are sealed respectively to said source and said region.

12. A gas lubricated bearing system for dissipating energy of radial oscillation at critical speeds comprising: a housing body having therethrough an opening the surface of which defines substantially a figure of revolution about an axis; a rotary shaft disposed along said axis within said housing body and having a pair of substantially conical journal surfaces disposed at mutually oppositely directed angles with respect to a plane perpendicular to said axis between said journal surfaces; a pair of internally substantially conical bearings each concentrically juxtaposed about a respective one of said journal surfaces with a spacing of juxtaposition which defines a containing region for a thin lubricating gas film; all metal cushion means for supporting at least one of said bearings from said housing body with an isotropic freedom of radial movement with respect thereto, said cushion means being of the character to exert a centralizing restoring force oscillatorily tending to center said at least one bearing about said axis; frictional damping means coupled between said housing body and said at least one bearing for absorbing and dissipating oscillatory energy of said at least one bearing; supporting means connected between one of said bearings and said housing body which permits axial movement of said one of said bearings with respect to said housing body; and axial movement biasing means associated with said supporting means tending to move said one of said bearings in the axial direction to decrease the magnitude of said spacing of juxtaposition between each of said bearings and its respective journal.

13. A gas lubricated bearing system comprising: a housing body having therethrough an opening the surface of which defines substantially a figure of revolution about an axis; an integral rotary shaft disposed along said axis within said housing body and having a conical, radial load supporting journal surface and a conical, thrust load supporting journal surface disposed at mutually oppositely directed angles with respect to a plane perpendicular to said axis between said journal surfaces, said thrust load journal having a conical angle of divergence from said axis which is greater than that of said radial load journal; a pair of internally substantially conical bearings each concentrically and geometrically similarly juxtaposed about a respective one of said journal surfaces with a spacing of juxtaposition which defines a containing region for a thin lubricating gas film; all metal cushion means for supporting at least one of said bearings from said housing body with an isotropic freedom of radial movement with respect thereto, said cushion means being of the character to exert a centralizing restoring force oscillatory tending to center said at least one bearing about said axis; frictional damping means coupled between said housing body and said at least one bearing for absorbing and dissipating oscillatory energy of said at least one bearing; supporting means connected between one of said bearings and said housing body which permits axial movement of said one of said bearings with respect to said housing body; and axial movement biasing means associated with said supporting means tending to move said one of said bearings in the axial direction to decrease the magnitude of said spacing of juxtaposition between each of said bearings and its respective journal.

14. The invention according to claim 13 which further includes axial travel limiting means supported by said housing body to contact said one of said bearings just before it would otherwise decrease said spacing of juxtaposition to zero.

15. A gas lubricated bearing system comprising: a stationary housing body having an opening therethrough disposed substantially angularly symmetrically about a longitudinal axis; a shaft in the form, substantially, of a figure of revolution about said axis and disposed substantially within said body and having a first and second end; a first conical journal surface disposed on said shaft about its said first end; a second conical journal surface disposed on said shaft about its said second end, said conical surfaces having oppositely directed angles of divergence with respect to a point on said axis between them; first and second bearings each having an internally conical surface disposed in juxtaposed relation with a respective one of said first and second journal surfaces, the conical surfaces which are juxtaposed having mutually equal angles of conical divergence from said axis; radially centering metal spring support means for supporting said first bearing from said housing body with an oscillatory radially isotropic freedom of motion; coulomb frictional damping means connected between said first bearing and said housing body; supporting means within said housing body for said second bearing which permits an axial freedom of motion therefor; means contained between said housing body and said first bearing for axially urging said first bearing in a direction to decrease the spacing of juxtaposition between both said juxtaposed pairs of conical surfaces; and means for holding both said bearings substantially rotationally stationary with respect to said housing body.

References Cited by the Examiner

UNITED STATES PATENTS

| 2,363,260 | 11/1944 | Peskin | 308—73 |
| 2,487,343 | 11/1949 | Kopf | 308—184 |
| 2,822,223 | 2/1958 | Offen | 308—122 |
| 3,058,785 | 10/1962 | Steele | 308—9 |
| 3,113,809 | 12/1963 | Eggmann | 308—26 |

FOREIGN PATENTS

| 12,514 | 1897 | Great Britain. |
| 796,926 | 6/1958 | Great Britain. |

DON A. WAITE, *Primary Examiner.*

FRANK SUSKO, *Examiner.*